United States Patent
Suda et al.

(10) Patent No.: US 8,724,446 B2
(45) Date of Patent: May 13, 2014

(54) WIRELESS COMMUNICATION SYSTEM AND WIRELESS COMMUNICATION METHOD

(75) Inventors: Kenji Suda, Kawasaki (JP); Hiroyuki Seki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 973 days.

(21) Appl. No.: 11/412,911

(22) Filed: Apr. 28, 2006

(65) Prior Publication Data

US 2007/0171810 A1    Jul. 26, 2007

(30) Foreign Application Priority Data

Jan. 20, 2006   (JP) ................... 2006-012364

(51) Int. Cl.
*H04J 11/00* (2006.01)

(52) U.S. Cl.
USPC ........... 370/208; 370/210; 370/355; 375/130; 375/260; 375/261; 375/354

(58) Field of Classification Search
USPC .......... 370/208, 210, 355; 375/130, 260, 261, 375/354
See application file for complete search history.

(56) References Cited

U.S. PATENT DOCUMENTS

| | | | | | |
|---|---|---|---|---|---|
| 5,583,562 | A | * | 12/1996 | Birch et al. | 725/151 |
| 5,818,813 | A | * | 10/1998 | Saito et al. | 370/208 |
| 6,115,354 | A | * | 9/2000 | Weck | 370/203 |
| 6,714,511 | B1 | | 3/2004 | Sudo et al. | |
| 2003/0090994 | A1 | * | 5/2003 | Kakura | 370/208 |
| 2004/0160987 | A1 | * | 8/2004 | Sudo et al. | 370/480 |
| 2004/0213145 | A1 | * | 10/2004 | Nakamura | 370/208 |
| 2005/0152302 | A1 | * | 7/2005 | Takahashi et al. | 370/321 |
| 2005/0157694 | A1 | * | 7/2005 | Lu et al. | 370/345 |
| 2006/0050624 | A1 | * | 3/2006 | Akita | 370/208 |
| 2006/0153061 | A1 | * | 7/2006 | Nishio | 370/208 |
| 2006/0250940 | A1 | * | 11/2006 | Tirkkonen et al. | 370/208 |
| 2007/0058595 | A1 | * | 3/2007 | Classon et al. | 370/337 |

FOREIGN PATENT DOCUMENTS

| | | |
|---|---|---|
| EP | 1 418 720 A1 | 5/2004 |
| EP | 06252277.6-2415 | 10/2006 |
| GB | 2 291 314 A | 1/1996 |
| JP | 9-135230 | 5/1997 |
| JP | 9-512156 | 12/1997 |
| JP | A-2000-244441 | 9/2000 |
| JP | A-2002-247005 | 8/2002 |

(Continued)

OTHER PUBLICATIONS

European Communication Report, Application No. P106109EP00/LES 06 252 277.6-2415, Dated Dec. 21, 2007, 5-pages.

(Continued)

*Primary Examiner* — Mark Rinehart
*Assistant Examiner* — Mang Yeung
(74) *Attorney, Agent, or Firm* — Myers Wolin, LLC

(57) ABSTRACT

In a wireless communication system which uses a plurality of guard interval lengths, data format of a fixed guard interval length determined at a constant period is placed for the purpose of enabling the determination of the guard interval length with low power consumption and reduction of the reception station's processing load without increasing the reception station's circuit scale. In addition, in the timing at which this fixed guard interval length placement information is placed, variable guard interval length placement information is multiplexed to a channel for data transmission and transmitted.

22 Claims, 17 Drawing Sheets

(56) References Cited

FOREIGN PATENT DOCUMENTS

| JP | A-2003-23410 | | 1/2003 |
|----|--------------|---|--------|
| JP | 2006-352786 | | 12/2006 |
| JP | 2006352786 A | * | 12/2006 |
| JP | 2008-536426 | | 9/2008 |
| KR | 9-5-2007-033883042 | | 6/2007 |
| WO | WO 2005004362 A1 | * | 1/2005 |
| WO | 2006/109134 | | 10/2006 |

OTHER PUBLICATIONS

Supplementary European Search Report, Application No. EP 01274838.0-2415 PCT/JP0110357; P101470EPPC/TCS.

A. M. Tonello et al., "*Analysis of the Uplink of an Asynchronous Multi-User DMT OFDMA System Impaired by Time Offsets, Frequency Offsets, and Multi-path Fading*" Vehicular Technology Conference, 2000. 52ND Sep. 24-28, 2000, Piscataway, NJ, USA, IEEE, vol. 3, Sep. 24, 2000, pp. 1094-1099.

The State Intellectual Property Office of China, First Notification of Office Action for corresponding Chinese Patent Application No. 2006/10082771.5, mailed Aug. 14, 2009.

Japanese Patent Office "Notice of Rejection Ground" for corresponding Japanese Patent Application No. 2006-012364, mailed on Jun. 29, 2010. Partial English translation attached.

Japanese Patent Office "Decision of Rejection" issued for corresponding Japanese Patent Application No. 2006-012364, mailed May 17, 2011. English translation attached.

Notice of Rejection Grounds issued for corresponding Japanese Patent Application No. 2011-178078 mailed May 22, 2012 with English translation.

* cited by examiner

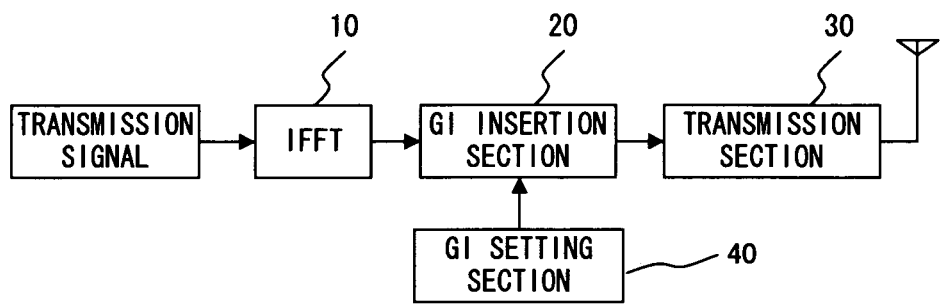
F I G. 6

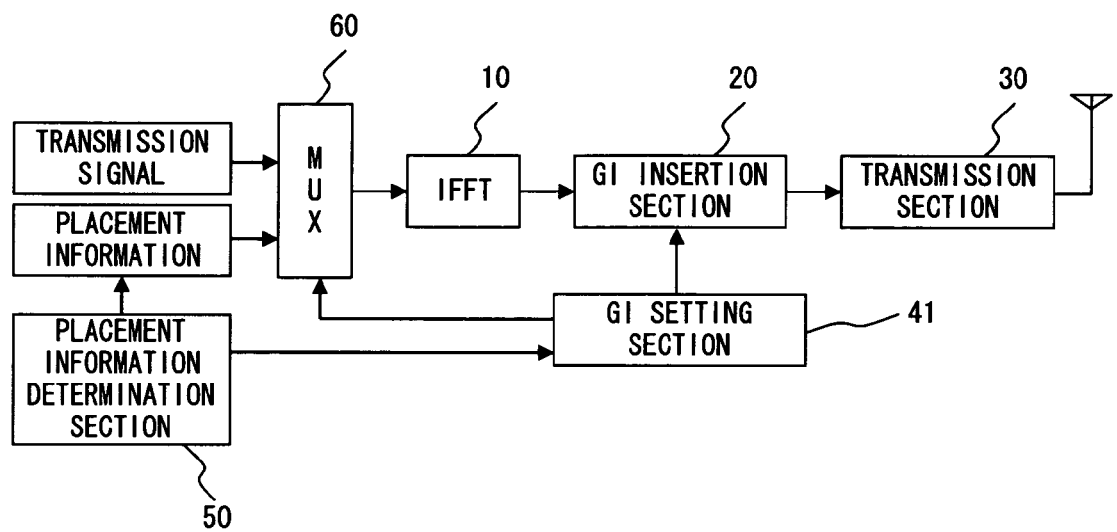
F I G. 8

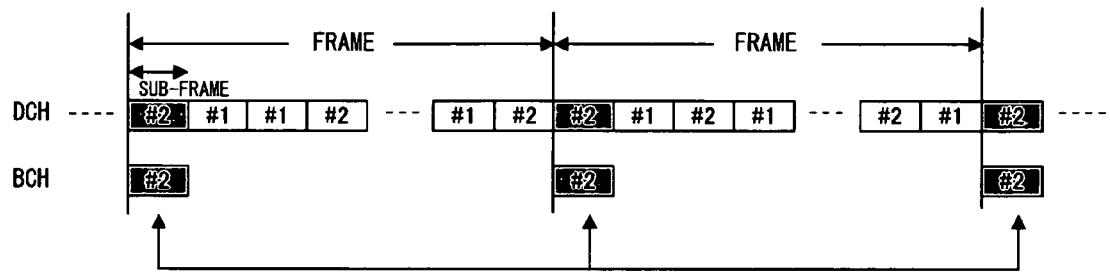
F I G. 10

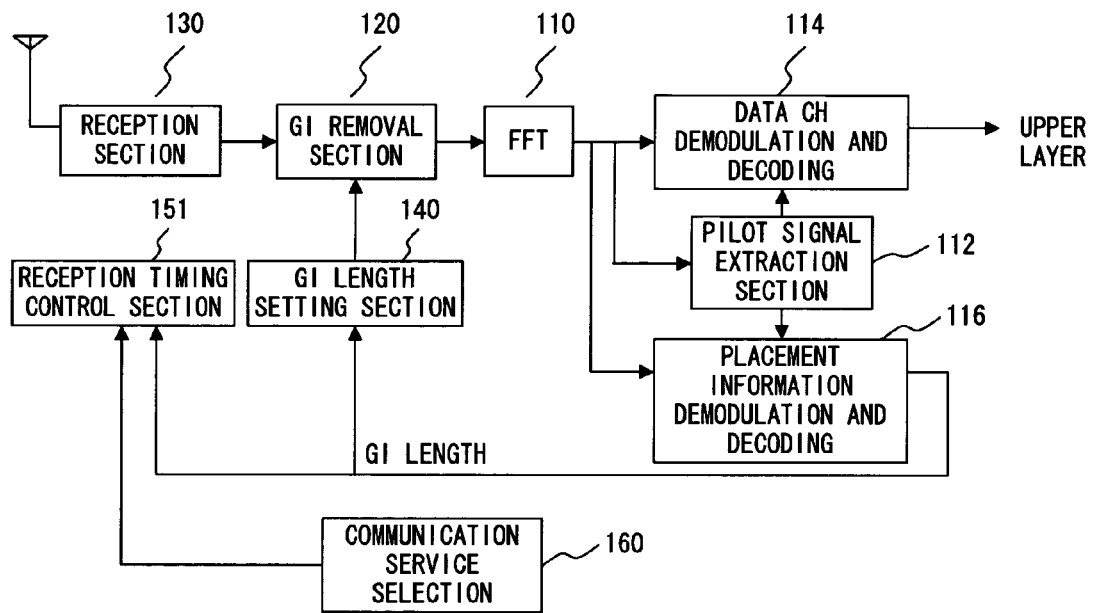
F I G. 1 3

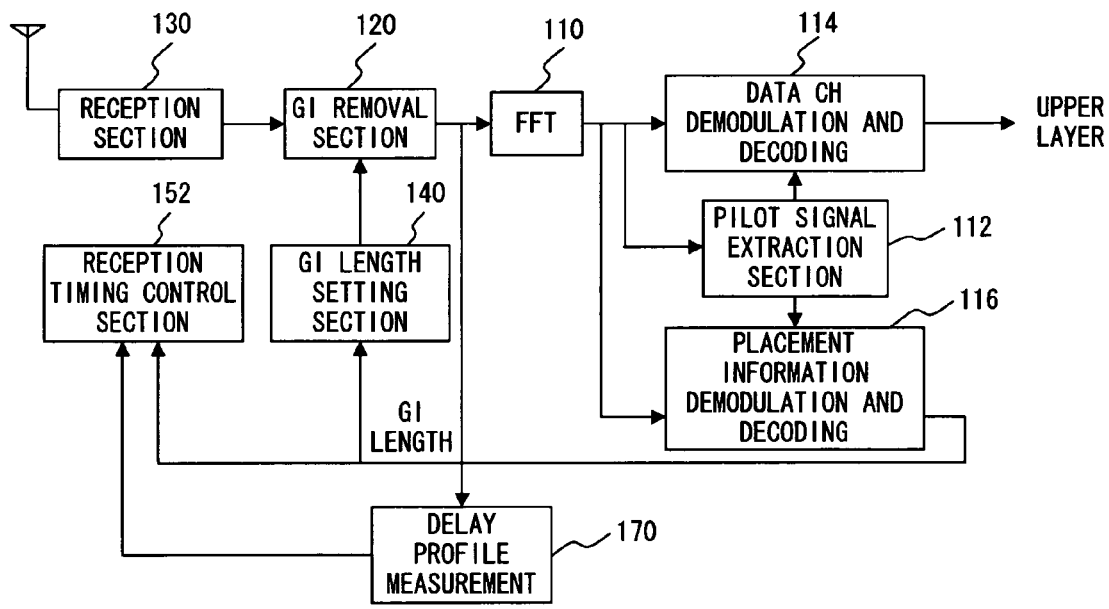
F I G. 1 5

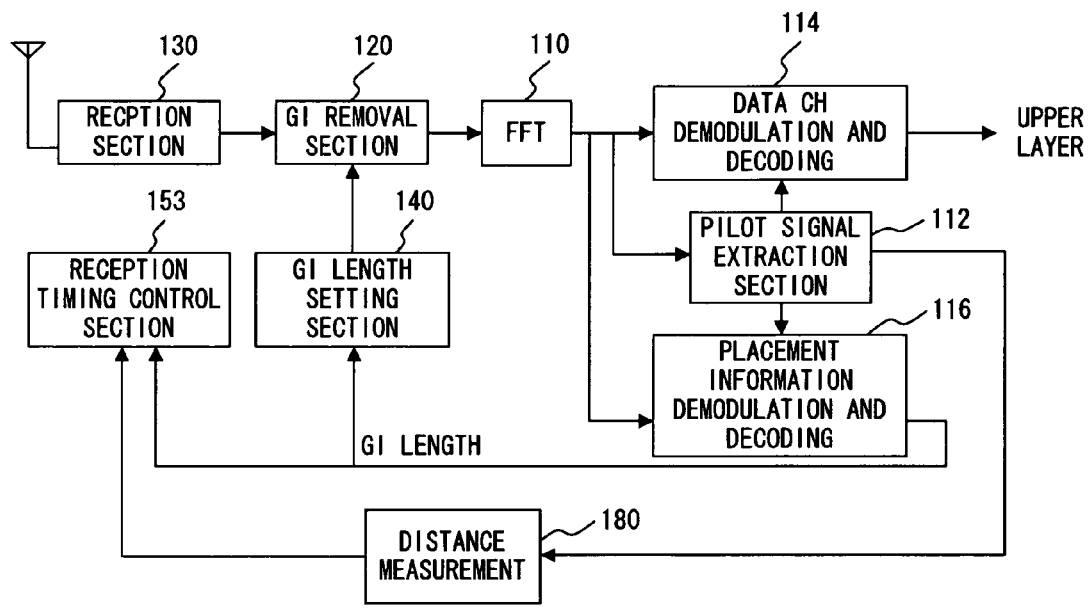
F I G. 16

WIRELESS COMMUNICATION SYSTEM AND WIRELESS COMMUNICATION METHOD

BACKGROUND OF THE INVENTION

1. Field of the Invention

The present invention relates to a wireless communication system and method thereof for inserting a guard interval into a symbol and transmitting the symbol to eliminate intersymbol interference due to multipath. In particular, the present invention relates to a wireless communication system and method thereof which use a plurality of guard interval lengths.

2. Description of the Related Art

For example, in a wireless communication system that implements OFDM (Orthogonal Frequency Division Multiplexing), a guard interval is commonly inserted to strengthen tolerance to multipath interference. Thus, as shown in FIG. 1, a guard interval is created by copying the signal at the tail-end part of an effective symbol and is inserted to the head and, with the effective symbol, serves as one OFDM symbol.

FIG. 2 shows the effect of delay waves that are generated due to multipath. When the longest delay due to multipath is shorter than the guard interval length, such as until delay wave 2 shown in FIG. 2, the adjacent symbol component does not enter during the FFT window period. Therefore, intersymbol interference due to multipath can be eliminated completely. However, if a delay wave 3, such as that shown in FIG. 3 exists, the adjacent symbol component enters and multipath interference is generated.

Therefore, increasing the guard interval length can reduce the effect of delay waves. At the same time, if the guard interval length is long, transmission efficiency is reduced, causing a reduction in bit rate.

Thus, although the guard interval length is preferably set to about the maximum path delay, the guard interval length must accommodate various cell placements and cell diameters when applying the OFDM wireless communication system to a cell phone system. It is impossible to determine the most suitable guard interval length for the overall system.

In addition, because the distribution of delay paths differ depending on the location of the terminal, even when the cell diameter is the same, it is difficult to configure the most suitable guard interval length.

As described above, it is difficult to apply one fixed guard interval length to all instances. Therefore, a wireless communication system is proposed, that can accommodate a plurality of guard interval lengths of long guard intervals and short guard intervals for each Sub-frame. The Sub-frame is the transmission unit of one transmission, as presented in Format #1 and Format #2 that are examples of data format into which the guard interval shown in FIG. 3 has been inserted, and performing adaptive control of the guard interval length through a wireless state is considered.

For example, in Patent Reference 1, below, a system, wherein a base station determines the guard interval length and notifies a mobile station of the guard interval length, is disclosed. In other words, as shown in FIG. 4 as a Conventional Example 1 related to the determination of guard interval length, this is a system wherein notification of guard interval information is given at every Sub-frame in a channel for notification (notification CH), in correspondence with a channel for transmitting data (DCH). The mobile station receives the notification CH at each Sub-frame, determines the guard interval, and performs DCH processing.

In addition, in Patent Reference 2, below, as shown in FIG. 5 as the Conventional Example 2 related to the determination of the guard interval length, a system wherein the mobile station detects the guard interval length from DCH information without using other information (blind detection) and performs DCH processing is disclosed.

[Patent Reference 1] Japanese Published Patent Application No. 2000-244441

[Patent Reference 2] Japanese Published Patent Application No. 2002-247005

SUMMARY OF THE INVENTION

In a wireless communication system using a plurality of guard interval lengths, the first parameter that should be known in order to receive transmitted data is the guard interval length. Therefore, the method for giving guard interval length notification is a significant issue.

In a method for giving guard interval length notification at every Sub-frame using a notification channel, the reception station must simultaneously receive a notification channel for every packet, which is the data transmission unit, and must determine the guard interval length. Then, the processing delay in the reception station becomes a problem. Additionally, the circuit scale increases, causing more problems.

In a method for performing blind detection of the guard interval length, a high-reliability blind detection is required at every Sub-frame. This increases the processing load and power consumption.

In addition, when a plurality of guard intervals are provided in the upstream communication from the terminals to the base station in a wireless communication system composed of a base station and a plurality of terminals, if data formats of differing guard intervals are used when a plurality of terminals perform a simultaneous random access such as call requests or a shared data communication wherein transmission is performed at the same timing to the base station, interference will occur and reception characteristics will deteriorate.

Therefore, the present invention resolves to enable the determination of the guard interval length with low power consumption in a wireless communication system that uses a plurality of guard interval lengths. In this invention, the processing load of the reception station is reduced without increasing the circuit scale of the reception station.

In addition, another issue to be resolved by the present invention is to prevent the occurrence of interference and prevent the deterioration of reception characteristics in a wireless communication system. The system is composed of a base station and a plurality of terminals which use a plurality of guard interval lengths, when a plurality of guard interval lengths are also provided in the upstream communication from the terminals to the base station.

According to the present invention, in a wireless communication system which uses a plurality of guard interval lengths, a communication method that places fixed guard interval length data format determined at a constant period is proposed.

Additionally, according to the present invention, at the timing where this fixed guard interval length data format is placed, variable guard interval length placement information is multiplexed and transmitted to a channel for data transmission. A reception station then controls the reception timing based on this transmitted placement information.

Furthermore, according to the present invention, in a wireless communication system composed of a base station and a plurality of terminals using a plurality of guard interval lengths, when a plurality of guard interval lengths are also provided in the upstream communication from the terminals to the base station, the placement of the guard interval length in the upstream communication from the terminals to the base station is determined based on the guard interval length placement information of which notification was given by the base station.

According to the present invention, the determined fixed guard interval length data format is placed at a constant period. The guard interval is already known at this timing, thereby reducing the processing load.

In addition, according to the present invention, because the placement information of variable guard interval lengths can be known in advance, processing can be reduced, an increase in the circuit scale can be prevented, and power can be conserved when there is no need for reception. When applied to a terminal of a wireless communication system composed of a base station and plurality of terminals, transmission can be performed with the same guard interval length as that notified by the guard interval length placement information. This prevents the deterioration of reception characteristics.

Furthermore, on the reception-end, determining whether to receive a short GI slot or a long GI slot can reduce power consumption. The determination is made by identifying the services requested by the reception end, the reception quality, the distance from the base station, and by determining the reception timing from the placement information.

BRIEF DESCRIPTION OF THE DRAWINGS

FIG. 6 is a configuration diagram of the transmission-end in a first embodiment of the present invention;

FIG. 8 is a configuration diagram of the transmission-end in a second embodiment of the present invention;

FIG. 10 is a diagram explaining the notification of guard interval length placement information in the second embodiment of the present invention;

FIG. 13 is a diagram showing a configuration example of the reception-end which performs reception timing control based on the communication service in the second embodiment of the present invention;

FIG. 15 is a diagram showing a configuration example of the reception-end which performs reception timing control based on the communication quality in the second embodiment of the present invention;

FIG. 16 is a diagram showing a configuration example of the reception-end which performs reception timing control based on the distance between the base station and the terminal in the second embodiment of the present invention.

DESCRIPTION OF THE PREFERRED EMBODIMENT

Hereinafter, the present invention is described using an OFDM wireless communication system as an example of a wireless communication system. However, from the descriptions hereinafter, it is clear to persons skilled in the art that the present invention is not limited to the OFDM wireless communication system. It can be applied to any wireless communication system that uses a plurality of guard interval lengths. In addition, although the present invention is described in some instances using mobile communication as an example, it is clear to persons skilled in the art that the present invention is not limited to mobile communication.

Figure 1:
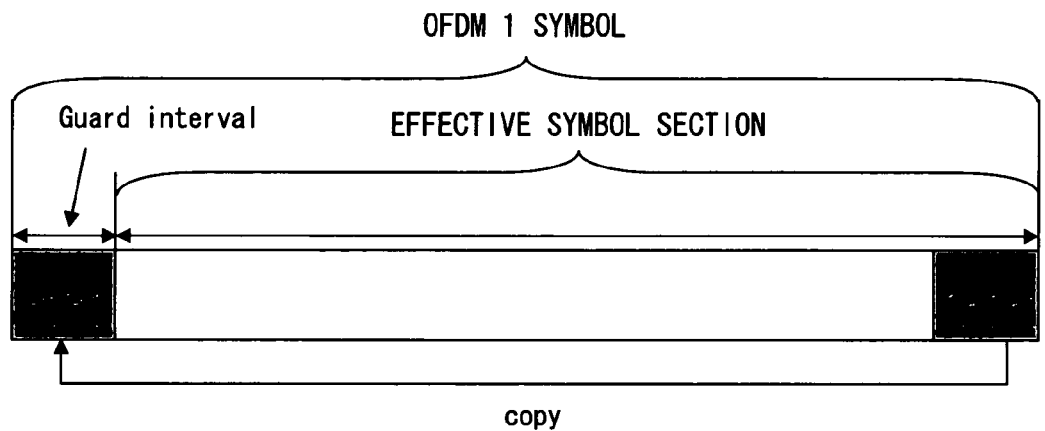
FIG. 1 is a diagram explaining the creation of a guard interval.
Figure 2:
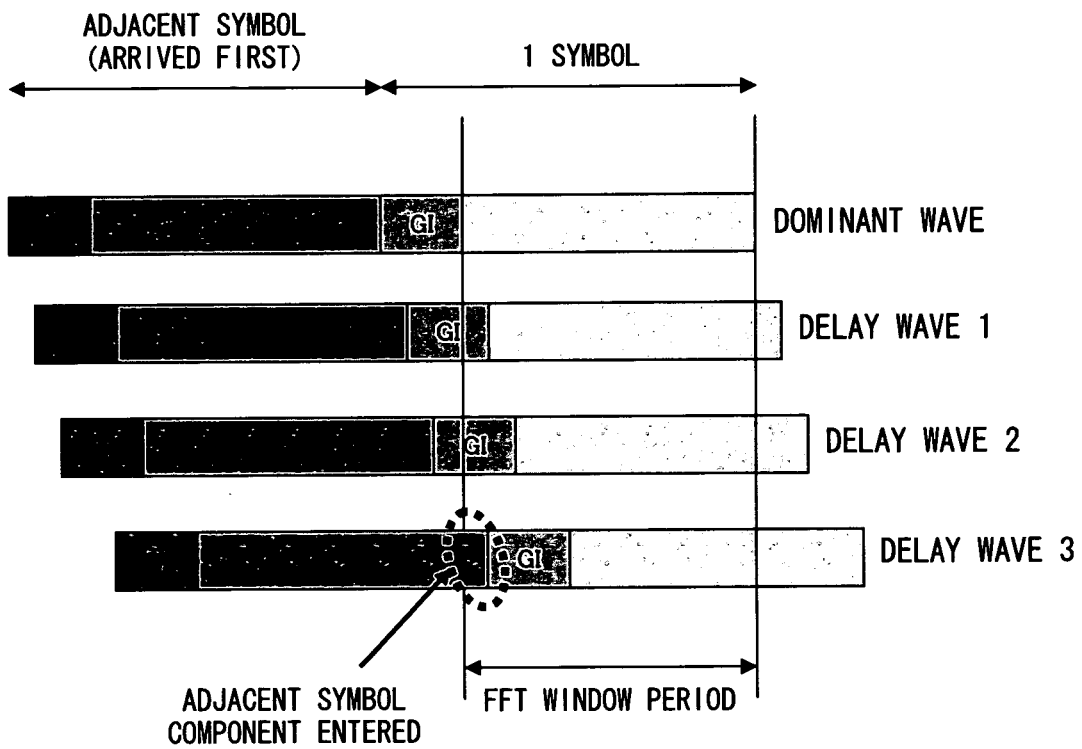
FIG. 2 is a diagram showing the effect of delay waves due to multipath.
Figure 3:
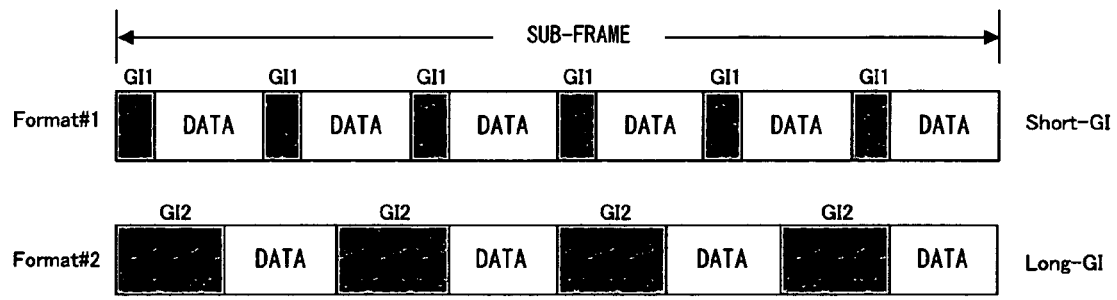
FIG. 3 is a diagram showing an example of a data format to which guard intervals have been inserted.
Figure 4:
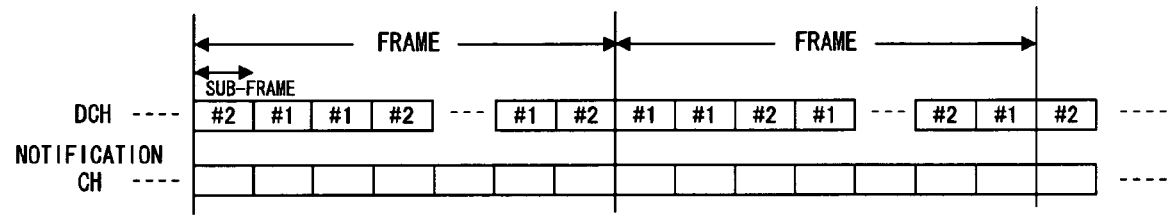
FIG. 4 is a diagram explaining a conventional Example 1 related to the determination of guard interval length.
Figure 5:
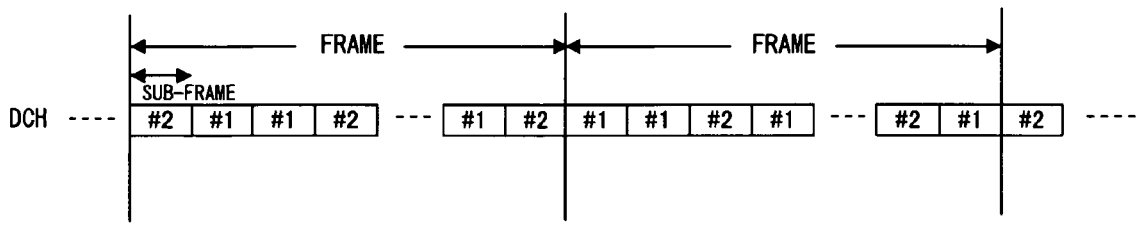
FIG. 5 is a diagram explaining a conventional Example 2 related to the determination of guard interval length.

Furthermore, hereinafter, the embodiments of the present invention are described with a wireless communication system using two types of guard interval lengths, shown in FIG. 3, as an example of a wireless communication system using a plurality of guard interval lengths. For example, if using two types of guard interval length, a short guard interval length data format #1 is selected for dedicated data and for small to medium cells (short cell diameter). A long guard interval length data format #2 is selected for broadcast/multicast data and for large cells (long cell diameter).

FIG. 6 is a diagram showing a configuration of the reception-end in a first embodiment of the present invention. As shown in FIG. 6, a guard interval setting section (40) is added to the configuration of a common OFDM communication transmission device. The device comprises of an inverse Fast Fourier transform section (10) which performs an inverse Fast Fourier transform on a transmission signal, a guard interval insertion section (20) for inserting a guard interval in the transmission signal on which the inverse Fast Fourier transform has been performed, and a transmission section (30) for transmitting the transmission signal in which the guard interval has been inserted.

The guard interval setting section (40) instructs guard interval insertion section (20) of the fixed guard interval length setting at every constant period.

The guard interval insertion section (20) inserts a fixed length guard interval at the specified timing.

Figure 7:
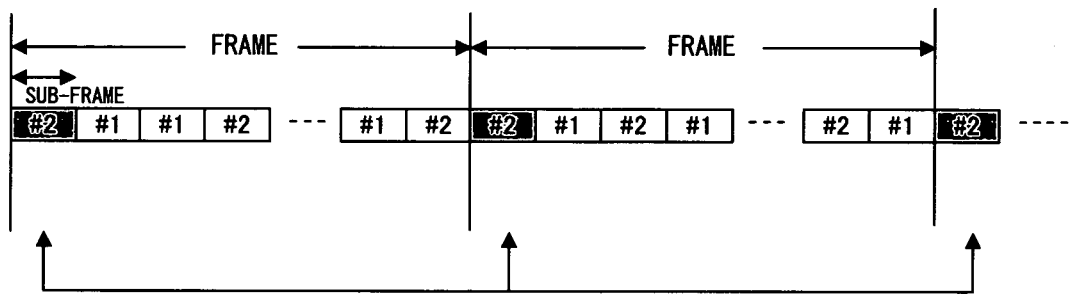
FIG. 7 is a diagram explaining the placement of a fixed guard interval length in the first embodiment of the present invention.

FIG. 7 is a diagram explaining the fixed guard interval length's placement in a first embodiment. For example, as shown by the arrow in FIG. 7, setting is made such that data format #2 is always placed at the head of the frame at a constant period, and transmission is performed.

FIG. 8 shows the configuration of the transmission-end in a second embodiment of the present invention. This embodiments, as compared to the first embodiment shown in FIG. 6, adds a placement information determination section (50) for determining the guard interval length placement information for every time slot of each frame and a multiplexing section (60). In addition to instructing the guard interval insertion section (20) of a fixed guard interval length's setting at every constant period, the guard interval setting section (41) instructs the guard interval insertion section (20) of a guard interval length's setting. The setting is based on the guard interval length placement information within a constant period determined by the placement information determination section (50). In addition, the guard interval setting section (41) instructs the multiplexing section (60) to multiplex the guard interval length placement information as determined by the placement information determination section (50) to the transmission signal.

Figure 9:
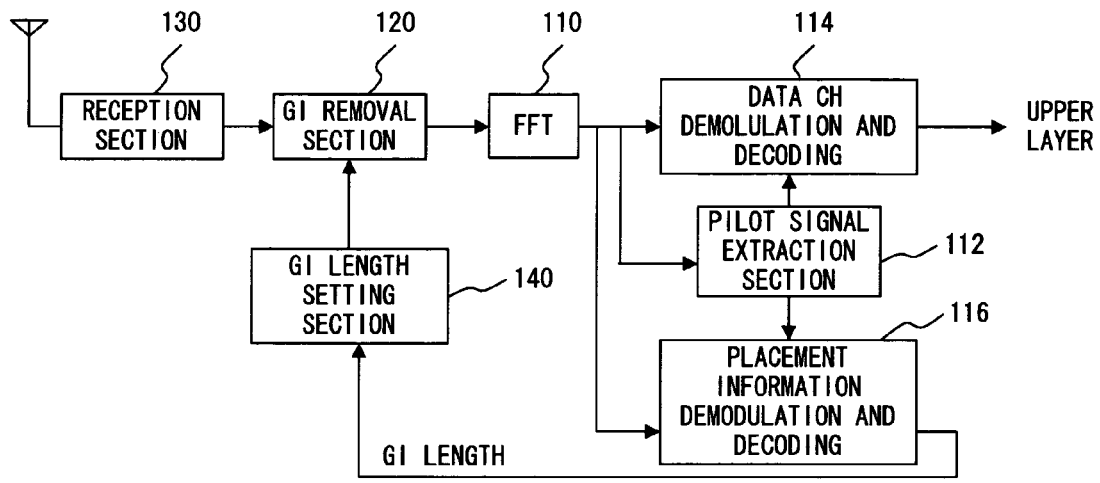
FIG. 9 is a configuration diagram of the reception-end in a second embodiment of the present invention.

FIG. 9 shows the configuration of the reception-end in the second embodiment of the present invention.

In the reception-end, a reception section (130) receives a wireless signal. A guard interval removal section (120) removes the guard interval having the length of the guard interval length specified by a guard interval length setting section (140) from the reception signal. After the guard interval removal section (120) removes the guard interval, a Fast Fourier transform section (110) performs a Fast Fourier transform on the reception signal. Once the Fast Fourier transform is performed, a pilot signal extraction section (112) extracts the pilot signal from the reception signal. A data channel demodulation and decoding section (114) performs demodulation and decoding of the data channel based on the extracted pilot signal, and the decoded reception data is sent to the upper layer. In addition, demodulation and the like of the notification information is performed at every period specified by a placement information demodulation and decoding section (116). It notifies the guard interval length setting section (140) of the guard interval length placement information within the frame.

FIG. 10 is a diagram explaining the notification of the guard interval length placement information in the foregoing second embodiment. In the example shown in FIG. 10, the guard interval length of data format #2, shown in FIG. 3 as the fixed guard interval, is placed in the first slot of each frame of a channel DCH for data transfer indicated by the arrow. Furthermore, the guard interval length is transmitted by the first slot of a notification channel BCH that is multiplexed to the channel DCH for dedicated data transfer. For slots subsequent to the second slot of the data transfer channel DCH, guard interval length placement information is then provided.

Figure 11:
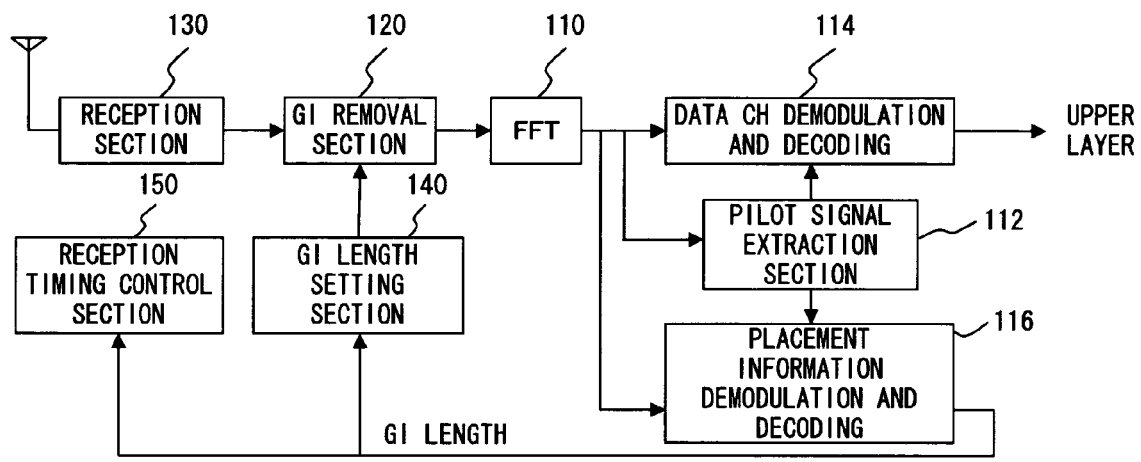
FIG. 11 is a diagram showing a configuration example of the reception-end which performs reception timing control based on the guard interval length placement information in the second embodiment of the present invention.

FIG. 11 is a diagram showing a configuration example wherein the reception timing control is performed based on the guard interval length placement information in the reception-end in the second embodiment. The components that have the same reference numbers as those in FIG. 9 are the same as those shown in FIG. 9. In addition to the components shown in FIG. 9, a reception timing control section (150) is provided.

The reception timing control section (150) determines the timing at which reception is to be performed from the guard interval length of the data to be received and the guard interval length placement information of which notification was given by the placement information demodulation and decoding section (116) and receives only the slots to be received.

Figure 12:
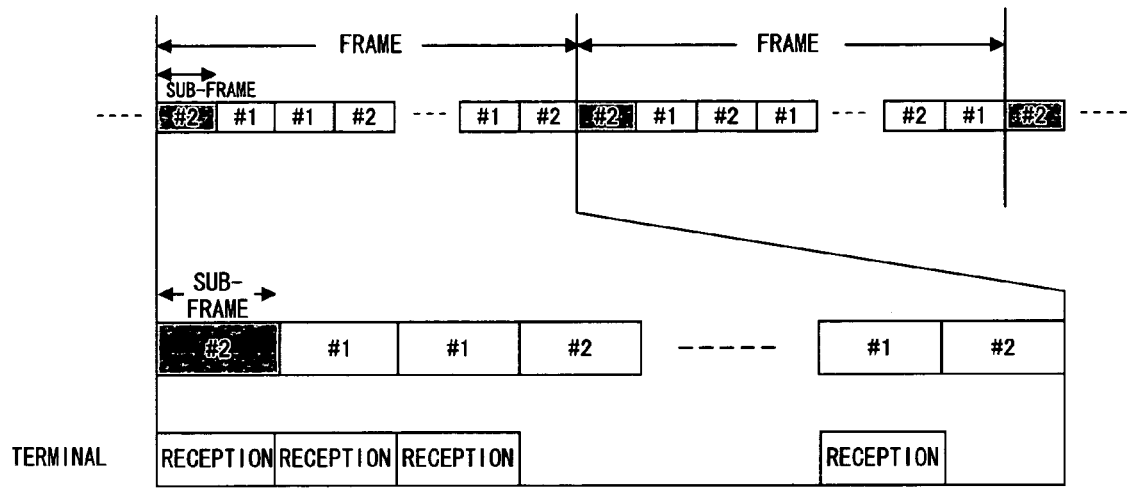
FIG. 12 is a diagram explaining the reception timing control by the guard interval length placement information in the second embodiment of the present invention.

FIG. 12 is a diagram explaining the reception timing control by the guard interval length placement information in the second embodiment. In FIG. 12, an instance wherein data format #1 is received by the reception-end is shown. In this example, the fixed guard interval length is the guard interval length of data format #2. First, the head slot to which the fixed guard interval length is transmitted is received. Although only data format #1 is received, data format #2 of the first slot is also received in order to receive the placement information within the frame. Only data format #1 is received for the subsequent slots.

FIG. 13 is a diagram showing a configuration example wherein reception timing control is performed based on the communication service in the reception-end in the second embodiment. A communication service selection section (160) is added to the configuration shown in FIG. 11. The communication service selection section (160) selects the communication service specified by the user by, for example key input or the like, and notifies the reception timing control section (151). If the data format used, depending on the communication service, is set in advance, each terminal can acknowledge the communication service specified by the user, determine the guard interval length of the data to be received accordingly, and receive the necessary data.

Therefore, the reception timing control section (151) controls the reception timing by the communication service selected in the communication service selection section (160). This is in addition to the guard interval length placement information notified by the placement information demodulation and decoding section (116).

Figure 14:
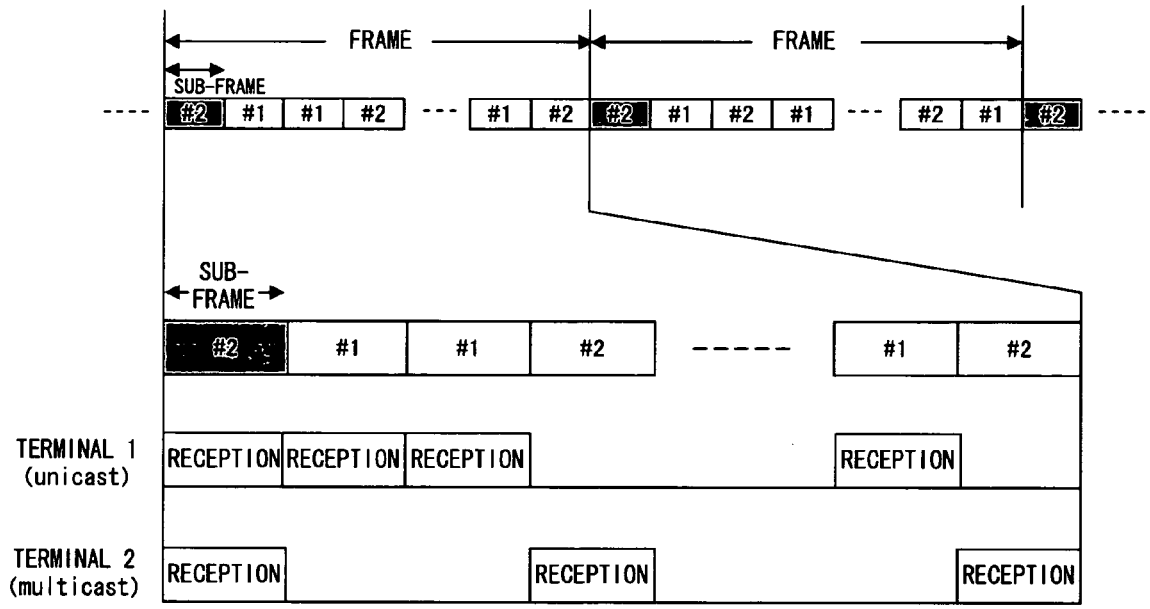
FIG. 14 is a diagram explaining the reception timing control by the communication service in the second embodiment of the present invention.

FIG. 14 is a diagram explaining the reception timing control by the communication service in the foregoing second embodiment. In the reception-end, the reception service determines the guard interval length to be received.

For example, when receiving unicast data, data format #1 with a short guard interval length is received. When receiving data such as multicast and the like, data format #2 with a long guard interval length is received. In the example in FIG. 14, the terminal 1 receives inicast data and the terminal 2 receives multicast data.

FIG. 15 is a diagram showing a configuration example of the reception-end that performs reception timing control based on communication quality. A delay profile measurement section (170) is added to the configuration shown in FIG. 11. The delay profile measurement section (170) measures the delay profile using the reception signal from which the guard interval has been removed in the guard interval removing section (120), before Fast Fourier transform is performed.

For example, in the reception-end the guard interval length to be received is determined by the delay profile, as the reception quality. Therefore, a reception timing control section (152) controls the reception timing by the delay profile measured in the delay profile measuring section (170). This is in addition to the guard interval placement information, where the placement information demodulation and decoding section (116) provides notification.

When the delay is short, data format #1 with a short guard interval length is received. When the delay is long, data format #2 with a long guard interval length is received.

FIG. 16 is a diagram showing a configuration example of the reception-end, which performs reception timing control based on the distance between the base station and the terminal, in the second embodiment of the present invention. A distance measurement section (180) is added to the configuration shown in FIG. 11. The distance measurement section (180) determines the distance between the base station and the terminal by the level of the pilot signal extracted in the pilot signal extraction section (112). The guard interval length to be received is then determined by the distance from the base station. Therefore, a reception timing control section (153) controls the reception timing by the distance measurement section's (180) determination of the distance between the base station and the terminal in addition to the guard interval placement information provided by the placement information demodulation and decoding section (116).

When the terminal is close to the base station, data format #1 with a short guard interval length is received. When the terminal is far from the base station, data format #2 with a long guard interval length is received.

Figure 17:
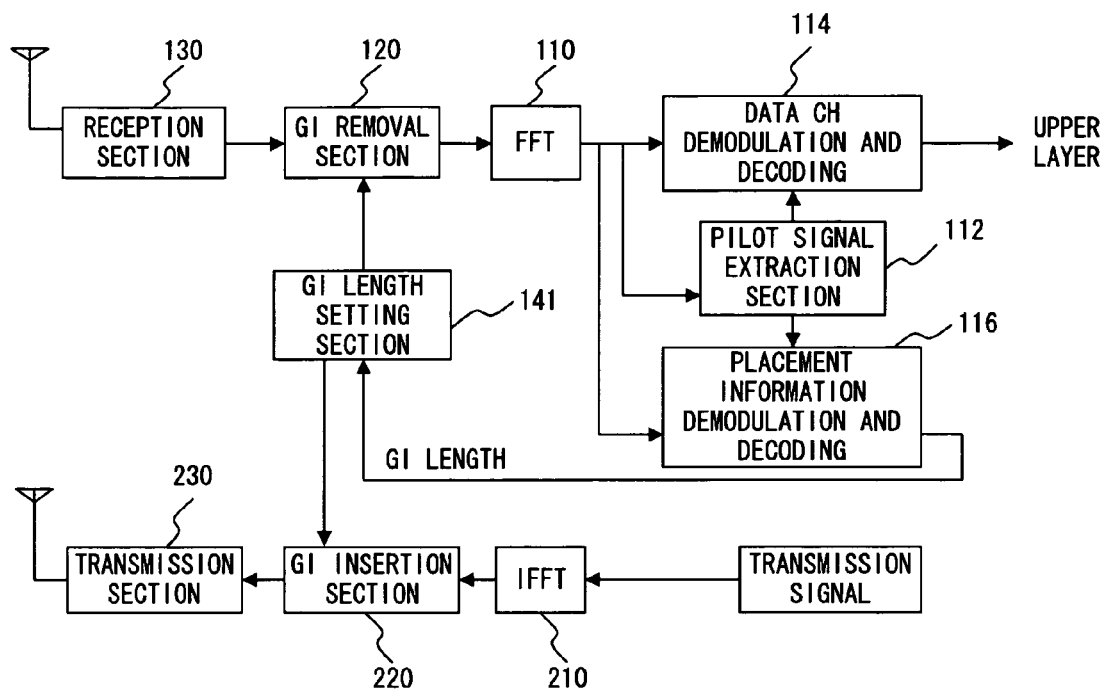
FIG. 17 is a configuration diagram of a terminal which determines the guard interval length transmitted from the terminal based on the guard interval length placement information from the base station in the second embodiment of the present invention.

FIG. 17 is a diagram showing a configuration example of a terminal that determines the guard interval length to be transmitted from the terminal-end based on the guard interval length placement information from the base station.

The inverse Fast Fourier transform is performed on the transmission signal of the terminal-end in the inverse Fast Fourier transform section (210). Then a guard interval is inserted in the guard interval insertion section (220). Lastly, the transmission signal is transmitted from the transmission section (230) as an upstream communication addressed to the base station.

In the reception-side of the terminal, the guard interval length of the data to be transmitted is determined at the same placement as the received guard interval length placement information. In the guard interval length setting section (141), the guard interval length to be transmitted is also determined simultaneously with the guard interval length to be received. The setting of the guard interval length is instructed to the guard interval insertion section (220).

Therefore, data format of the same guard interval length is also applied when a plurality of terminals perform a simultaneous random access such as call requests or shared data communication wherein transmission is performed simultaneously to the base station, thereby preventing the occurrence of interference.

What is claimed is:

1. A wireless communication system which uses a plurality of guard intervals of differing lengths, wherein:
    the wireless communication system uses a frame comprising a plurality of sub-frames being units of a transmission, the sub-frames comprising a plurality of data symbols and guard intervals between the data symbols, each sub-frame being transmitted every frame period, and a different guard interval length being available for each sub-frame; and
    the wireless communication system includes a transmission device comprising:
        a guard interval insertion section configured to insert a guard interval of a fixed length between each of the data symbols in a specified sub-frame of the frame;
        a placement information determination section configured to determine placement information pertaining to a placement of a sub-frame to which guard intervals different in length from the guard interval of the fixed length are to be applied; and
        a multiplexing section configured to multiplex the placement information determined by the placement information determination section into a transmission signal in a sub-frame at a specific position in the frame.

2. The wireless communication system according to claim 1, wherein
    the transmission device further comprises a guard interval setting section configured to instruct the guard interval insertion section of setting of a fixed guard interval length in the specified sub-frame.

3. The wireless communication system according to claim 1, wherein the sub-frame at the specific position is the specified sub-frame.

4. The wireless communication system according to claim 1, wherein notification is given of information containing the placement information.

5. A reception device of the wireless communication system according to claim 4 which comprises a guard interval removal section configured to remove a guard interval from a reception signal, comprising:
    a guard interval length setting section for instructing the guard interval removal section of the guard interval length to be removed, based on the placement information of which notification was given.

6. The reception device according to claim 5, comprising:
    a reception timing control section configured to determine a timing at which reception is to be performed based on the guard interval length of a data to be received and the placement information of which notification was given.

7. The reception device according to claim 6, comprising:
    a communication service selection section configured to select a communication service; wherein said reception timing control section determines which guard interval length data is to be received, based on the communication service selected by the communication service selection section.

8. The reception device according to claim 6, comprising:
    a delay profile measurement section configured to measure a delay profile of a reception signal; wherein
    said reception timing control section determines which guard interval length data is to be received, based on the delay profile measured by the profile measurement section.

9. The reception device according to claim 6, comprising:
    a distance measurement section configured to measure a distance between a transmission device and said reception device itself; wherein
    said reception timing control section determines which guard interval length data is to be received, based on the distance measured by the distance measurement section.

10. The wireless communication system according to claim 1, wherein the sub-frame at the specific position is a sub-frame at a head of the frame.

11. The wireless communication system according to claim 1, wherein the placement information determined by the placement information determination section indicates whether a guard interval length applied in each sub-frame in the frame is the fixed length or not.

12. The wireless communication system according to claim 1, wherein each sub-frame includes a plurality of orthogonal frequency division multiplexing symbols and each guard interval length applied in each sub-frame is used as a length of a guard interval in each of the plurality of orthogonal frequency division multiplexing symbols in each sub-frame.

13. A wireless communication system containing a base station and a plurality of terminals, wherein:
    the wireless communication system uses a frame comprising a plurality of sub-frames being units of a transmission, the sub-frames comprising a plurality of data symbols and guard intervals between the data symbols, each sub-frame being transmitted every frame period, and a different guard interval length being available for each sub-frame;
    the base station comprises:
        a guard interval insertion section configured to insert a guard interval of a fixed length between each of the data symbols in a specified sub-frame of the frame;
        a placement information determination section configured to determine placement information pertaining to a placement of a sub-frame to which guard intervals different in length from the guard interval of the fixed length are to be applied; and a multiplexing section configured to multiplex the placement information determined by the placement information determination section into a transmission signal in a sub-frame at a specific position in the frame;

the plurality of terminals is notified of information containing the placement information; and the plurality of terminals determine a guard interval length of a guard interval inserted into a transmission data, based on the placement information, when transmitting data from the terminals to the base station.

14. A terminal implemented in the wireless communication system according to claim 13, which comprises a guard interval removal section configured to remove a guard interval from a reception signal and a guard interval insertion section configured to insert a guard interval in a transmission signal, comprising:

a guard interval length setting section configured to instruct the guard interval removal section of the guard interval length to be removed, based on the placement information of which notification was given, and to instruct the guard interval insertion section of the guard interval setting with a guard interval length according to the placement information of which notification was given.

15. A wireless communication method using a plurality of guard intervals with differing lengths, wherein:

a wireless communication system uses a frame comprising a plurality of sub-frames being units of a transmission, the sub-frames comprising a plurality of data symbols and guard intervals between the data symbols, each sub-frame being transmitted every frame period, and a different guard interval length being available for each sub-frame;

a transmission device of the wireless communication system inserts a guard interval of a fixed length between each of the data symbols in a specified sub-frame of the frame;

the transmission device determines placement information pertaining to a placement of a sub-frame to which guard intervals different in length from the guard interval of the fixed length are to be applied; and the transmission device multiplexes the determined placement information into a transmission signal in a sub-frame at a specific position in the frame.

16. The wireless communication method according to claim 15, wherein notification is given of information containing the placement information.

17. The wireless communication method according to claim 16, wherein a timing at which reception is to be performed is determined from the placement information at a reception-end.

18. The wireless communication method according to claim 17, wherein a communication service selects the guard interval length of data to be received.

19. The wireless communication method according to claim 17, wherein the guard interval length of data to be received is selected by a communication quality.

20. The wireless communication method according to claim 17, wherein the guard interval length of data to be received is selected by a distance between a transmission-end and the reception-end.

21. A wireless communication method according to claim 15 which is a wireless communication method between a base station including the transmission device and a plurality of terminals, wherein in the communication from the base station to the plurality of terminals, the guard interval of the fixed length is inserted between each of the data symbols in the specified sub-frame;

the plurality of terminals is notified of information containing the placement information; and the plurality of terminals determine a guard interval length inserted into a transmission data, based on the placement information, when transmitting data from the terminals to the base station.

22. A base station, wherein:

the base station uses a frame comprising a plurality of sub-frames being units of a transmission, the sub-frames comprising a plurality of data symbols and guard intervals between the data symbols, each sub-frame being transmitted every frame period, and a different guard interval length being available for each sub-frame; and the base station comprises:

a guard interval insertion section configured to insert a guard interval of a fixed length between each of the data symbols in a specified sub-frame of the frame;

a placement information determination section configured to determine placement information pertaining to a placement of a sub-frame to which guard intervals different in length from the guard interval of the fixed length are to be applied; and a multiplexing section configured to multiplex the placement information determined by the placement information determination section into a transmission signal in a sub-frame at a specific position in the frame.

* * * * *